United States Patent [19]

Hudgins et al.

[11] Patent Number: 4,810,375
[45] Date of Patent: Mar. 7, 1989

[54] MICROWAVE EMULSION TREATER WITH OILY WATER RECYCLE FOR WATER LOAD

[75] Inventors: Roger L. Hudgins; Nicholas O. Wolf, both of Ponca City, Okla.

[73] Assignee: Conoco Inc., Ponca City, Okla.

[21] Appl. No.: 173,798

[22] Filed: Mar. 28, 1988

[51] Int. Cl.⁴ .................... B01D 17/032; B01D 17/04
[52] U.S. Cl. .................................. 210/112; 210/121; 210/181; 210/195.1; 210/197; 210/513; 210/748
[58] Field of Search ............... 210/112, 114, 119, 121, 210/122, 181, 195.1, 197, 513, 536, 748, DIG. 5; 196/155

[56] References Cited

U.S. PATENT DOCUMENTS

| | | |
|---|---|---|
| 781,093 | 1/1905 | Post ..................................... 210/513 |
| 2,257,997 | 10/1941 | Barnes ................................. 252/349 |
| 2,522,378 | 9/1950 | Kirkbride ..................... 210/DIG. 5 |
| 3,104,711 | 9/1963 | Haagensen ............................ 166/60 |
| 3,133,592 | 5/1964 | Tomberlin ............................ 166/60 |
| 3,170,519 | 2/1965 | Haagensen ............................ 166/60 |
| 3,200,567 | 8/1965 | May ..................................... 210/748 |
| 3,523,076 | 8/1970 | Goerz, Jr. et al. .................. 210/748 |
| 3,594,314 | 7/1971 | Bilhartz, Jr. et al. ............... 210/219 |
| 3,606,731 | 9/1971 | Cole et al. .......................... 210/181 |
| 3,971,719 | 7/1976 | Peters ................................. 210/121 |
| 4,180,718 | 12/1979 | Hanson ........................ 219/10.55 A |
| 4,257,895 | 3/1981 | Murdock ............................. 210/243 |
| 4,582,629 | 4/1986 | Wolf .................................... 210/748 |

Primary Examiner—Richard V. Fisher
Assistant Examiner—Linda S. Evans
Attorney, Agent, or Firm—Richard W. Collins

[57] ABSTRACT

A microwave-based emulsion treating system comprising a microwave energy source, a microwave applicator for treating an oil-water emulsion, a wave guide between the microwave energy source and the microwave applicator, a circulator in the wave guide, a separator vessel for receiving and separating microwave-treated emulsion, and means for removing an oily water phase from the separator, circulating it to a water load chamber on the circulator, and returning it from the water load chamber to the separator.

2 Claims, 1 Drawing Sheet

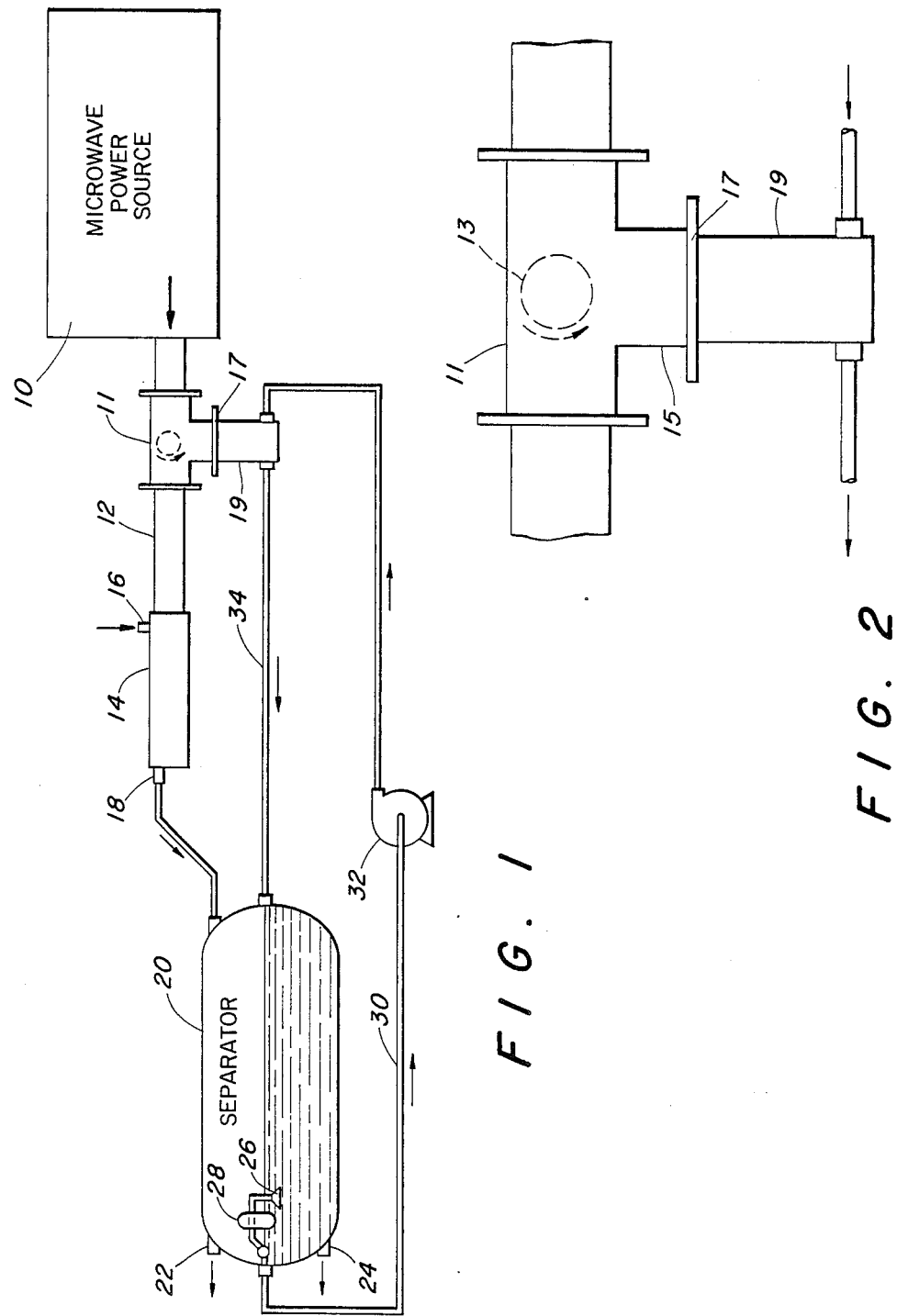

MICROWAVE EMULSION TREATER WITH OILY WATER RECYCLE FOR WATER LOAD

BACKGROUND OF THE INVENTION

1. Field of the Invention

The present invention relates to a method for enhancing the separation of oil and water dispersions and emulsions. More particularly, the present invention is concerned with enhancing separation of oil and water emulsions and dispersions by treating the same with microwave radiation, whether alone or in conjunction with more conventional separating devices.

In the petroleum industry, most of the crude oil produced is co-mingled with water and gas. It is therefore necessary to provide a means of sufficiently and economically separating the oil, gas and water for separate discharge. Usually the separated water is returned to a subterranean formation containing oil and the separated oil is conducted to a pipeline for ultimate transportation to a refinery and end use. Normally, the separated gas is vented if in small quantities or if in commercial quantities collected for distribution and sale.

Primary production of oil from subterranean oil-bearing reservoirs is normally obtained by exploiting the natural drive energy of the reservoir in the form of water drive, gas cap drive, solution gas drive, and combinations thereof. Oil remaining in the reservoir after primary energy sources have been depleted can be partially recovered by secondary recovery methods. One of the most common secondary recovery methods is waterflooding. Using this method, flooding water is injected into the reservoir through one or more injection wells traversing the oil-bearing reservoir. The water displaces the oil in the reservoir and moves it through the reservoir toward one or more production wells from which oil is produced.

With the rising value of petroleum products, it becomes increasingly important that separator equipment utilized by the petroleum industry extract the maximum possible recovered petroleum products from oil and water emulsions and dispersions. To this end, improved separating vessels have been developed from time to time over the years. Initially, the separators were merely open vessels providing a quiet zone with the intention that the water settle out and be withdrawn from the bottom of the vessel and that the petroleum float on the water and be withdrawn from the top of the vessel. While this system is satisfactory to a degree, it nevertheless results in some oil remaining in the form of an emulsion or dispersion with the withdrawn water, and in like manner in water being entrapped with the oil withdrawn from the top of the vessel. Further, such gravitational settling procedures are slow and require vessels of such volume that to allow separation by gravitation alone becomes exceedingly expensive, and the slow separation rate results in general overall inefficiency.

2. The Prior Art

Representative but non-exhaustive examples of various types of apparatus previously used in the art are gun barrel treaters, heater treaters, and the like. An apparatus specifically designed for use in separating oil and water can be found in, for example, U.S. Pat. No. 4,257,895. The use of ultrasonics is known for breaking oil-water emulsions as described in U.S. Pat. Nos. 2,257,997; 3,200,567; and 3,594,314. Other references disclose the application of microwave energy in the recovery of oil from oil wells and oil shale, including U.S. Pat. Nos. 3,104,711, 3,133,592; 3,170,519 and 4,180,718. Microwave energy has also been used in settling of solids and sewage and sewage sludge, such as described in U.S. Pat. No. 3,523,076.

More recently, a method for enhancing the separation of oil and water from an emulsion or dispersion was described in U.S. Pat. No. 4,582,629. The method described in that patent has been effective up to a point, but has been limited in application because of certain energy inefficiencies. The present invention provides a system for improving the efficiency of microwave-based oil-water separators.

It is accordingly an object of this invention to provide a microwave based oil-water separation system having a higher efficiency than previously available systems.

DESCRIPTION OF THE DRAWINGS

FIG. 1 is a schematic view of a microwave-based oil-water separator system in accordance with the invention.

FIG. 2 is an elevational view showing details of a circulator and water load chamber.

DESCRIPTION OF THE PREFERRED EMBODIMENT

Referring to the drawings, a microwave power source 10 is provided with a circulator 11 and a wave guide 12 extending to an applicator 14. Applicator 14 is provided with inlet 16 and outlet 18 for passage of an oil-water emulsion or dispersion. Outlet 18 extends to an oil-water separator tank 20 where the microwave treated stream separates into an upper oil phase and a lower oily water phase. Outlets 22 and 24 are provided from the upper and lower portions respectively, of separator 20 for recovery of the separated phases.

As best seen in FIG. 2, circulator 11 provides a path between microwave source 10 and wave guide 12, or it can be considered part of the wave guide. Magnets 13 are provided in circulator 11 in a known manner to deflect reflected energy down through conduit 15 and through diaphragm 17 into a water load chamber 19 on circulator 11 to prevent the reflected energy from returning to and damaging the microwave energy source.

Inside separator 20 an intake means 26 is attached to and carried by a float device 28 adapted to float at the interface between the liquid phases in the separator. Intake means 26 is disposed to rest near but below the interface between the liquid phases, such that the predominantly water phase (oily water) can be withdrawn therethrough to a recycle line 30.

A pump 32 is provided in recycle line 30 for pumping oily water from line 30 to water load chamber 19 where the oily water serves as a dummy water load to absorb reflected microwave energy. Return line 34 extends from water load chamber 19 back to separator 20.

By properly positioning intake means 26, the recirculated fluid will always be predominantly water. It is preferred to arrange the float 28 and intake 26 such that intake 26 remains just below the interface of the separated phases in the separator. This can be accomplished by using flexible tubing or a suitable pivoting connection as will be apparent. By recycling the oily water, additional heat is added to the separator that would otherwise be lost, and separation of the oil droplets in the oily water is enhanced as compared to a once-through system.

The system as described above could be used in conjunction with other conventional separators (not shown) either upstream or downstream from the microwave-based system.

OPERATION OF THE SYSTEM

The operation of the system as illustrated in the drawing is straightforward. Oil-water emulsion or dispersion is conveyed via inlet 16 to applicator 14 where it is heated by microwave energy from power source 10 through circulator 11 and wave guide 12. The heated stream exits applicator 14 through outlet 18 to separator 20, where the stream separates into an upper oil phase and a lower oily water phase. The separated phases are recovered through outlets 22 and 24 on separator 20.

A recycle oily water stream passes from intake 26 through recycle line 30 to water load chamber 19 where it is used as an energy absorbing water load. The recycled oily water picks up some additional heat which is returned to separator 20 to further enhance the separation.

Any level of control can readily be applied to the system to control throughput, amount of energy applied, interface level, etc., to obtain a desired separation.

We claim:
1. In a microwave-based emulsion treating system comprising a microwave power source means, a microwave applicator having inlet and outlet means for material to be treated with microwave energy, a separator for receiving treated material from said applicator, said separator including separate outlet means for removal of an oil phase and an oily water phase separated therein, circulator means between said microwave power source means and said applicator, and a load chamber providing a water load for absorption of reflected energy from said circulator means, the improvement comprising:
    (a) means for withdrawing a portion of said oily water phase from said separator and circulating it to said load chamber; and
    (b) means for conducting said oily water phase from said load chamber back to said separator.
2. The system as defined in claim 1 wherein said means for withdrawing a portion of said oily water phase from said separator comprises an intake means attached to and disposed below an interface float adapted to float in said separator at the interface between said oil phase and said oily water phase therein.

* * * * *